United States Patent
Gitai et al.

(10) Patent No.: US 8,239,423 B2
(45) Date of Patent: Aug. 7, 2012

(54) SYSTEM AND METHOD FOR SEMANTIC EXPOSURE OF DATA STORED IN A DYNAMIC SCHEMA

(75) Inventors: Asaf Gitai, Haifa (IL); Ronen Cohen, GeSher Haiv (IL); Uri Haham, Harhur (IL)

(73) Assignee: SAP AG, Walldorf (DE)

( * ) Notice: Subject to any disclaimer, the term of this patent is extended or adjusted under 35 U.S.C. 154(b) by 188 days.

(21) Appl. No.: 12/495,519

(22) Filed: Jun. 30, 2009

(65) Prior Publication Data

US 2010/0332510 A1     Dec. 30, 2010

(51) Int. Cl.
  *G06F 7/00*     (2006.01)
(52) U.S. Cl. ......................................... 707/803; 707/809
(58) Field of Classification Search .................. 707/717, 707/783, 803
  See application file for complete search history.

(56) References Cited

U.S. PATENT DOCUMENTS

| | | | |
|---|---|---|---|
| 6,038,563 A * | 3/2000 | Bapat et al. ........................... | 1/1 |
| 2004/0078300 A1 * | 4/2004 | Smith et al. ..................... | 705/27 |
| 2005/0050076 A1 * | 3/2005 | Tong et al. ..................... | 707/100 |
| 2009/0037769 A1 * | 2/2009 | Babkin et al. .................... | 714/15 |
| 2009/0144320 A1 | 6/2009 | Weinberg et al. | |
| 2010/0241644 A1 * | 9/2010 | Jackson et al. ................ | 707/760 |

OTHER PUBLICATIONS

U.S. Appl. No. 12/275,934, filed Nov. 21, 2008, 36 pages.
U.S. Appl. No. 12/276,009, filed Nov. 21, 2008, 40 pages.
U.S. Appl. No. 12/275,942, filed Nov. 21, 2008, 44 pages.

* cited by examiner

*Primary Examiner* — Amy Ng
(74) *Attorney, Agent, or Firm* — Buckley, Maschoff & Talwalkar LLC

(57) ABSTRACT

A system and method for providing semantic access of data in a master data management system. Data stored in a dynamic repository schema is exposed in a semantically accurate format. The schema is determined from information received from the master data management system describing the schema. A set of database views is generated based on said schema. A query from an external application in a standard query language is received and the query is performed using at least one database view. The database views are updated when a schema change is detected.

12 Claims, 7 Drawing Sheets

```
USE [AGBPDViewsSlave_m000]
GO
/****** Object: View [dbo].{M_BusinessPartner_0]  ******/
SET ANSI_NULLS ON
GO
SET QUOTED_IDENTIFIER ON
GO
    CREATE VIEW [dbo].{M_BusinessPartner_0] AS
SELECT A2i_1.Id 'MDMInternalId',
    CAST(A1_TEXT_F74.TextField AS nvarchar(10)) 'InternalID',
        F_Categories_0_F25.DisplayField 'Category',
    CAST(A1_TEXT_F26.TextField AS nvarchar(80)) 'GivenNameName1Name',
    CAST(A1_TEXT_F61.TextField AS nvarchar(80)) 'FamilyNameName2AdditionalName',
    CAST(A1_TEXT_F47.TextField AS nvarchar(40)) 'BirthPlaceName',
    CAST(FLOOR( CAST A2i1.F48 AS float)) AS DATETIME) 'BirthDate' |
CASE WHEN A2i_1.F49 = 1 then N'True' |
    ELSE CASE WHEN A2i_1.F49 = 0 then N'False' ELSE NULL END
END 'BirthDateProtectedIndicator',
CAST(FLOOR(A2i_1.F50 CAST AS float)) AS DATETIME) 'DeathDate'
...
```

| MDMIntern... | InternalID | Category | GivenName... | FamilyName... | BirthPlaceN... | BirthDate | BirthDateP... | Death Date |
|---|---|---|---|---|---|---|---|---|
| 1 | 000001 | NULL | Asaf | Gitai | Israel | NULL | NULL | NULL |
| 2 | 000002 | NULL | Ronen | Cohen | Israel | NULL | NULL | NULL |
| 3 | 000003 | NULL | Daniel | Cofman | USA | NULL | NULL | NULL |
| 4 | 000004 | NULL | Natalie | Braham | Germany | NULL | NULL | NULL |
| NULL | NULL | NULL | NULL | NULL | NULL | NULL | NULL | NULL |

| MDMIntern... | InternalID | Category | GivenName... | FamilyName... | BirthPlaceN... | BirthDate | BirthDateP... | Death Date |
|---|---|---|---|---|---|---|---|---|
| 1 | 000001 | NULL | Asaf | Gitai | Israel | NULL | NULL | NULL |
| 2 | 000002 | NULL | Ronen | Cohen | Israel | NULL | NULL | NULL |
| 3 | 000003 | NULL | Daniel | Cofman | USA | NULL | NULL | NULL |
| 4 | 000004 | NULL | Natalie | Braham | Germany | NULL | NULL | NULL |
| 5 | 000005 | NULL | John | Smith | USA | NULL | NULL | NULL |
| NULL | NULL | NULL | NULL | NULL | NULL | NULL | NULL | NULL |

520

Create_main_table_view(tableId) {
   view_name = Create_template_view_name()
   If view_name not in template_list
      For each viewable member field:
         Call addSqlParts
         If look up is single value
            Call Create_lookup_table_view()
         Else if look up is tuple
            add field to multi valued fields views
      Add view template to end of template_list
      For each multi valued look up member field
         Call Create_MV_lookup_table_view()
}

Create_lookup_table_view(tableId) {
   view_name = Create_template_view_name()
   If view_name not in template_list
      For each viewable member field
         Call addSqlParts
         If look up is single value
            Call Create_lookup_table_view()
         Else if look up is tuple
            add field to multi valued fields views
      Add view template to end of template_list
      For each multi valued look up member field
         Call Create_MV_lookup_table_view()
}

Create_MV_lookup_table_view(tableId) {
   view_name = Create_template_view_name()
   If view_name not in template_list
      For each viewable member field
         Call addSqlParts
         If look up is single value
            Call Create_lookup_table_view()
         Else if look up is tuple
            add field to multi valued fields views
      Add view template to end of template_list
}

FIGURE 6

SYSTEM AND METHOD FOR SEMANTIC EXPOSURE OF DATA STORED IN A DYNAMIC SCHEMA

BACKGROUND OF THE INVENTION

1. Field of the Invention

Embodiments of the solution described herein pertain to the field of computer systems. More particularly, but not by way of limitation, one or more embodiments relate to the semantic exposure of data stored in a dynamic schema.

2. Description of the Related Art

Master data management systems simplify maintenance and promote data integrity by simplifying the user's view of the data stored in its repository. For example, SAP's Master Data Management Environment (MDME) system is an integrated system for master data management that uses a Structured Query Language (SQL) database management system (DBMS), but does not require designers to use SQL for searching, sorting, and retrieving of information. Standard SQL DBMS do not support the types of advanced structures necessary for managing master databases. Generally speaking, master data management systems consist of a thick shell of functionality on top of a SQL-based DBMS to provide a scalable database where data is fully accessible to other applications and tools.

The schema of a database system describes the organizational structure of data stored in the database. In a relational database, the schema defines tables, fields, and relationships between fields and tables. Large commercial data repositories are often changed and revised over their lifetimes. These changes include changes to the schema, such as adding tables and fields, changing relationships, and editing data dictionaries. The MDME system has a dynamic schema, or a schema which is fully extensible and customizable. To access data stored in a dynamic schema using a standard query language, such as SQL, an application must be aware of any schema changes. Therefore, hard-coded queries relying on a schema are inadequate.

Accuracy of data in a large commercial data repository is of critical importance. Some master data management systems restrict direct access to the underlying data, such as requiring access through an application programming interface (API). In this case, the master data management system has complete control over the data and allows it to handle and store data in a proprietary schema. This allows a master data management system to store data efficiently and control the consistency of data records. When a master data management system may be designed to optimize factors, such as time efficiency, space efficiency, hierarchy, or other factors, data is not always presented in a meaningful way when only a single table is accessed. While the API helps provide meaningful access of data, the API does not offer the semantic exposure of data in a standard protocol understood by external applications.

External applications using a standard query language, such as structured query language (SQL), are used to manage data stored in databases. External applications include data profiling tools useful for analyzing the data, including data quality. External applications also include third party matching tools, business warehouse applications, and reporting tools for creating formatted reports against data stored in the master data management repository. However, external applications programmed to communicate with a database using a standard query language cannot communicate with a master data management system which limits third party access to requests made through an API. It is essential to expose the master data in a way that would be accessible and understandable for external applications to communicate with a master data management system in a protocol they are familiar with.

There are currently no known systems that provide the semantic exposure of data stored in a dynamic schema.

For at least the limitations described above there is a need for a system and method for exposing data stored in a dynamic schema in a semantically accurate format accessible to external applications in a standard query language.

BRIEF SUMMARY OF THE INVENTION

One or more embodiments enable a system and method for providing semantic access of data stored in a master data management system. Data stored in a dynamic repository schema is exposed in a semantically accurate format accessible by external applications using a standard query language, such as SQL.

In one or more embodiments of the solution described is this disclosure, a schema is determined from information received from the master data management system describing the schema, such as metadata tables or table and field name and properties. A set of database views is generated based on the schema. In one or more embodiments, a database view comprises a stored query. A query from an external application in a standard query language, such as SQL, is received and the query is performed using at least one database view.

In one or more embodiments of the disclosure, external applications have read-only access to data stored in the master data management system, and queries are limited to read-only operations. In one or more embodiments, database views are specific to each client accessing the data. Access to different sets of data is granted based on login information or other authentication methods.

In one or more embodiments of the disclosure, database views are updated when a schema change is detected. The changed schema is determined from new information received from the master data management system describing the changed schema. An updated set of database views is generated based on said schema. At least a subset of database views is replaced with the updated set of database views. In one or more embodiments of the disclosure, the entire set of database views is unloaded, an updated set of database views is generated, and the entire updated set of database views is reloaded.

Furthermore, one or more embodiments of the solution set forth here enable a computer system configured to provide semantic access of data in a master data management system. The computer system includes a specially programmed computer comprising computer-readable instructions which configure the computer system to receive information describing a dynamic schema, determine the schema from the information, generate a set of database views based on the schema, receive a query from an external application in a standard query language, and perform the query using at least one database view.

BRIEF DESCRIPTION OF THE DRAWINGS

The above and other aspects, features and advantages of the disclosure will be more apparent from the following more particular description thereof, presented in conjunction with the following drawings wherein:

FIG. 4 illustrates an exemplary DB view as generated in one or more embodiments.

FIG. 5A illustrates a table corresponding to an exemplary DB view query in one or more embodiments.

FIG. 5B illustrates a table corresponding to an exemplary DB view query in one or more embodiments.

FIG. 6 provides pseudocode for recursive DB view generation according to one or more embodiments.

DETAILED DESCRIPTION

A method and system for providing semantic exposure of data stored in a dynamic schema will now be described. In the following exemplary description numerous specific details are set forth in order to provide a more thorough understanding of embodiments of the solution described herein. It will be apparent, however, to an artisan of ordinary skill that the solution may be practiced without incorporating all aspects of the specific details described herein. In other instances, specific features or functions well known to those of ordinary skill in the art have not been described in detail so as not to obscure the solution. Readers should note that although examples of the embodiments are set forth herein, the claims, and the full scope of any equivalents, are what define the invention.

Figure 1:
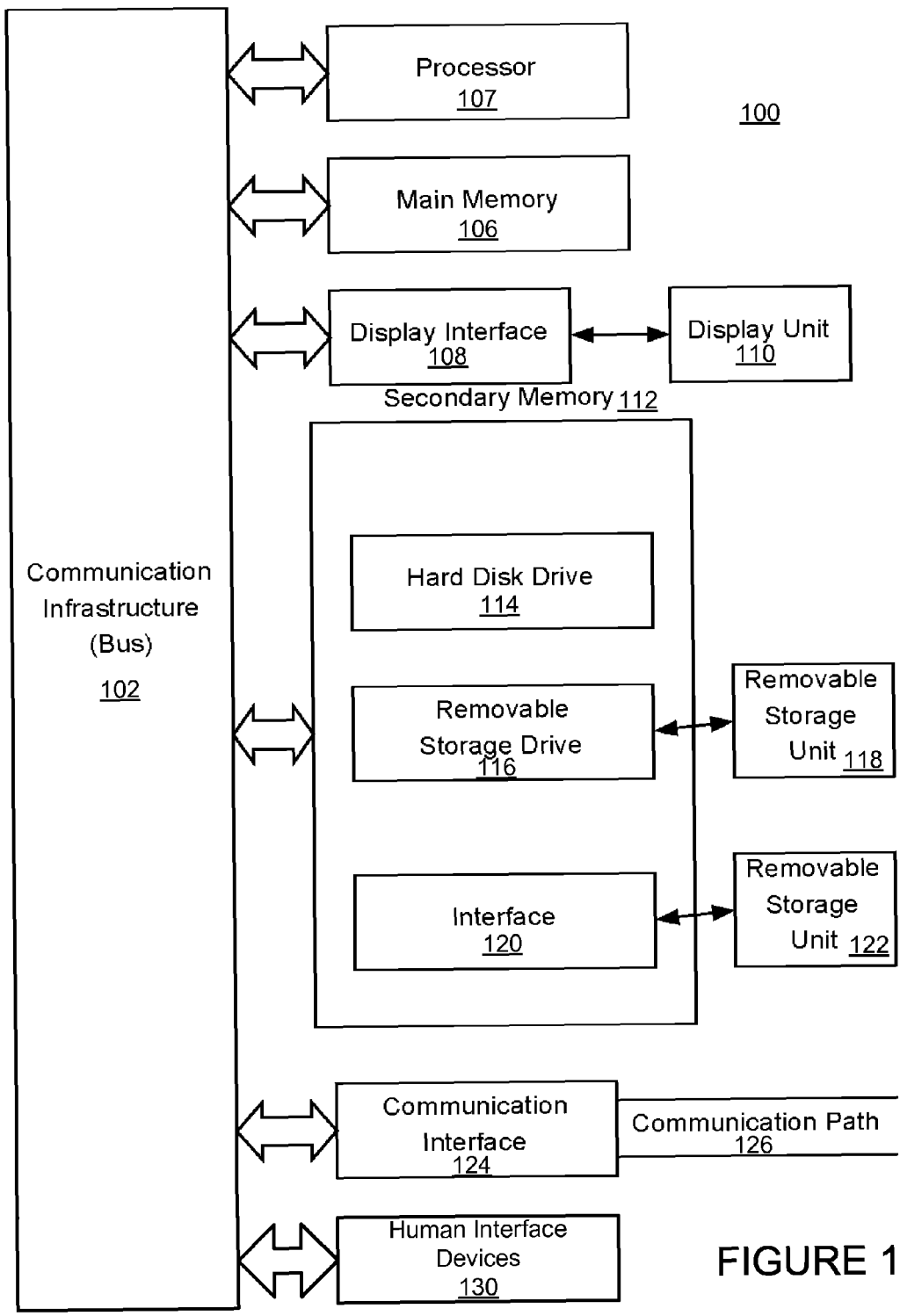
FIG. 1 illustrates an exemplary computer system on which the system and method of the solution described here may be practiced.

FIG. 1 is provided for purposes of illustrating a general-purpose computer 100 and peripherals which, when programmed as described herein, may operate as a specially programmed computer capable of implementing one or more methods, apparatus and/or systems implementing the solution described herein. Processor 107 may be coupled to a bidirectional communication infrastructure such as Communication Infrastructure System Bus 102. Communication Infrastructure 102 may generally be a system bus that provides an interface to the other components in the general-purpose computer system such as Processor 107, Main Memory 106, Display Interface 108, Secondary Memory 112 and/or Communication Interface 124.

Main memory 106 may provide a computer readable medium for accessing and executed stored data and applications. Display Interface 108 may communicate with Display Unit 110 that may be utilized to display outputs to the user of the specially-programmed computer system. Display Unit 110 may comprise one or more monitors that may visually depict aspects of the computer program to the user. Main Memory 106 and Display Interface 108 may be coupled to Communication Infrastructure 102, which may serve as the interface point to Secondary Memory 112 and Communication Interface 124. Secondary Memory 112 may provide additional memory resources beyond main Memory 106, and may generally function as a storage location for computer programs to be executed by Processor 107. Either fixed or removable computer-readable media may serve as Secondary Memory 112. Secondary Memory 112 may comprise, for example, Hard Disk 114 and Removable Storage Drive 116 that may have an associated Removable Storage Unit 118. There may be multiple sources of Secondary Memory 112 and systems of the disclosed solution may be configured as needed to support the data storage requirements of the user and the methods described herein. Secondary Memory 112 may also comprise Interface 120 that serves as an interface point to additional storage such as Removable Storage Unit 122. Numerous types of data storage devices may serve as repositories for data utilized by the specially programmed computer system. For example, magnetic, optical or magnetic-optical storage systems, or any other available mass storage technology that provides a repository for digital information may be used.

Communication Interface 124 may be coupled to Communication Infrastructure 102 and may serve as a conduit for data destined for or received from Communication Path 126. A Network Interface Card (NIC) is an example of the type of device that once coupled to Communication Infrastructure 102 may provide a mechanism for transporting data to Communication Path 126. Computer networks such Local Area Networks (LAN), Wide Area Networks (WAN), Wireless networks, optical networks, distributed networks, the Internet or any combination thereof are some examples of the type of communication paths that may be utilized by the specially program computer system. Communication Path 126 may comprise any type of telecommunication network or interconnection fabric that can transport data to and from Communication Interface 124.

To facilitate user interaction with the specially programmed computer system, one or more Human Interface Devices (HID) 130 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to Processor 107 to trigger one or more responses from the specially programmed computer are within the scope of the system disclosed herein.

While FIG. 1 depicts a physical device, the scope of the system disclosed may also encompass a virtual device, virtual machine or simulator embodied in one or more computer programs executing on a computer or computer system and acting or providing a computer system environment compatible with the methods and processes disclosed herein. Where a virtual machine, process, device or otherwise performs substantially similarly to that of a physical computer system, such a virtual platform will also fall within the scope of a system, notwithstanding the description herein of a physical system such as that in FIG. 1.

One or more embodiments are configured to enable the specially programmed computer to take the input data given and transform it into a source-independent server interface by applying one or more of the methods and/or processes of the solution as described herein.

Figure 2:
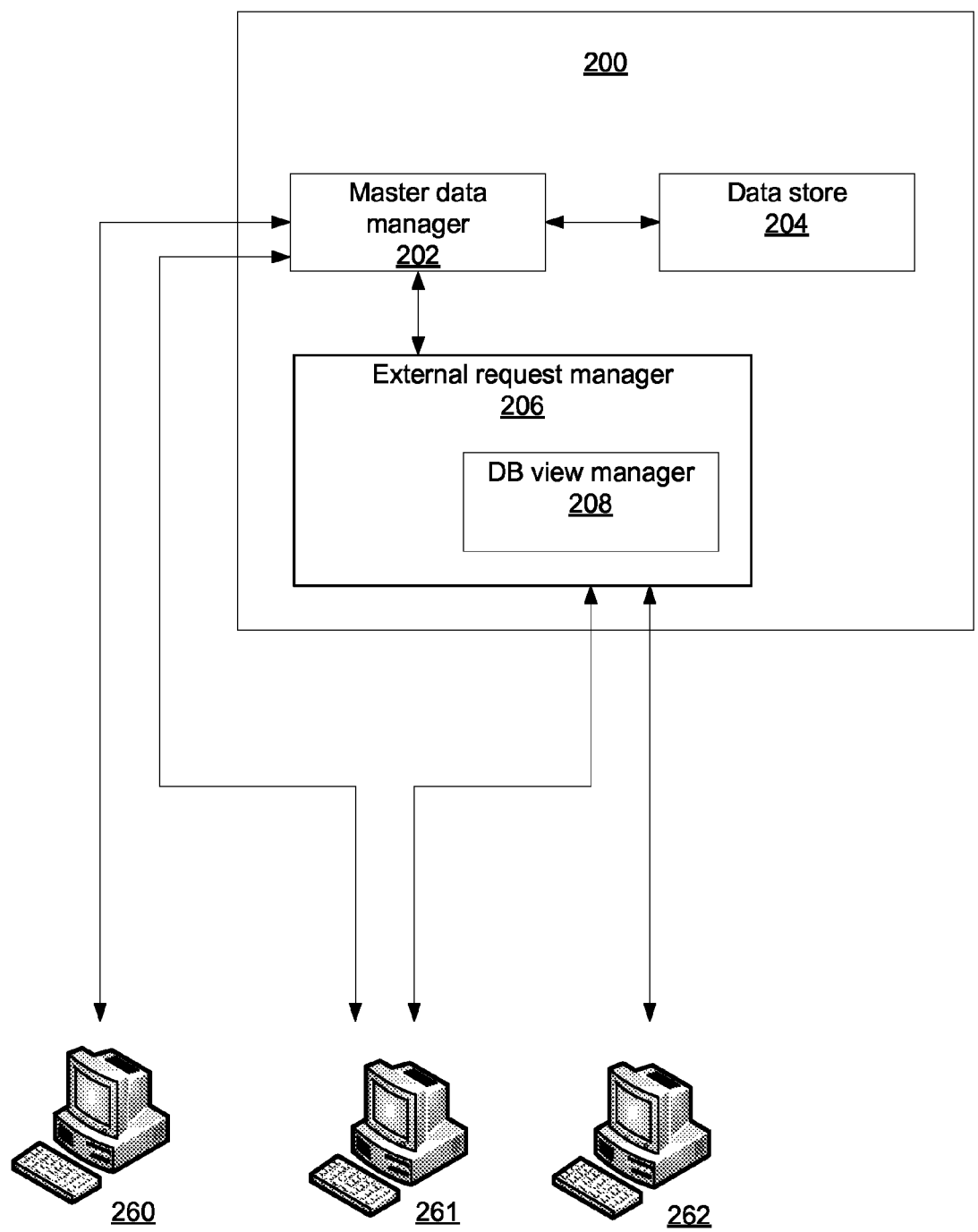
FIG. 2 is a block diagram of a master data management system according to one or more embodiments.

FIG. 2 is a block diagram of a master data management system configured in accordance with one or more embodiments. System 200 comprises master data manager 202, data store 204 and external request manager 206. In one or more embodiments, master data manager 202, data store 204 and external request manager 206 reside on the same computer system 101. In one or more embodiments, master data manager 202 and external request manager 206 are components of a single server program for master data management. Alternatively, master data manager 202, data store 204 and external request manger 206 are implemented on two or more computer systems.

Data store 204 resides on a memory device, such as magnetic, optical or magnetic-optical storage systems, or any other available mass storage technology that provides a repository for digital information. In one or more embodiments, data store 204 resides in secondary memory 112. Data store 204 serves as a repository of data records managed by data manager 200.

Master data manager 202 manages data in data store 204, including generation, deletion, update, and any other modification of any record in data store 204. Master data manager 202 also provides requested data in response to a query. Master data manager 202 substantially performs the functions provided by a standard database management system (DBMS). In one or more embodiments, master data manager 202 handles any access to records in data store 204. In one or more embodiments, master data manager 202 stores data in data store 204 according to a dynamic schema and master data manager 202 is configured to handle schema changes.

Master data clients 260-261 communicate with master data manager 202 to access data stored in data store 204. Master data clients 260-261 include any program configured to communicate with master data manager 202. In one or more embodiments, master data clients 260-261 communicate with master data manager 202 using an application programming interface (API) for master data manager 202. The API for master data manager 202 includes functionality provided by a standard database management system to create, delete, update or otherwise modify data in data store 204. In one or more embodiments of the solution disclosed herein, the API for master data manager 202 includes functionality to manage and modify the schema. Communications between master data clients 260-261 and master data manager 202 take place over a network, such as a local area network, wide area network, wireless network, or any other network. Alternatively, a master data client resides on the same computer system 100 as master data manager 202 and communication occurs over a communication infrastructure 102.

External request manager 206 provides an interface for applications to access data managed by master data manager 202. The interface allows data managed by master data manager 202 to be accessed using a standard query language, such as SQL. In one or more embodiments, external request manager 206 communicates with master data manager 202 using an API for master data manager 202. Alternatively, external request manager 206 and master data manager 202 are components of a single server program. In one or more embodiments, external request manager 206 has direct access to data structures managed by data manager 202 and stored in data store 204.

External request manager 206 includes DB view manager 208. DB view manager generates and stores database views (DB views). DB views are generated based on schema information provided by master data manager 202. The schema information provided by master data manager 202 is any set of information from which the schema may be determined, such as table and field names and properties. In one or more embodiments, the schema information comprises metadata from metadata tables managed by master data manager 202. A DB view comprises a stored query, such as a SQL query. Alternatively, a DB view comprises information describing commands to retrieve data from data store 204 through master data manager 202 in accordance with an API of master data server 202. Although the stored query can generate a table of information organized a meaningful way to an external application, a stored query does not replicate data in data store 204 in a separate table or any other data structure. Rather, records in data store 204 are accessed when the stored query is executed. Because master data manager 202 retains control over the data and because no data is replicated, no synchronization issue arises between a DB view and records in data store 204.

DB view manager 208 updates DB views when a change is detected in the schema. In one or more embodiments, master data manager 202 or another component of system 200 notifies DB view manager 208 of schema changes. Schema changes include new or deleted tables and fields, changed relationships, edits to data dictionaries or any other schema change. Alternatively, DB view manager 208 actively detects schema changes. It will be apparent to an artisan of ordinary skill that many methods exist in the art to implement event notification or detection. DB view manager 208 unloads all stored DB views, generates new DB views based on the changed schema, and reloads the newly generated DB views. The generation of DB views is computationally fast. Alternatively, only a selection of affected DB views is generated and replaced.

Clients 261-262 include any program configured to access data using a standard query language, such as SQL. Clients 261-262 include external applications such as data profiling tools, matching tools, business warehouse applications, reporting tools. Clients 261-262 communicate with external request manager 206 by sending a query to access data presented by DB views. In one or more of the solutions disclosed herein, access to data in store 204 through external request manager 206 is limited to read-only access. Read-only access allows an external application to access and analyze data in data store 204 while leaving control and maintenance of data to master data manager 202. Alternatively, external request manager 206 is configured to provide greater access to data in data store 204. In one or more embodiments of the disclosure, external request manager 206 is configured to generate and provide a client-specific DB view to each client. Access to different sets of data is granted based on login information or other authentication methods. A client-specific DB view is a database query restricted to a subset of data stored in data store 204. Communications between clients 261-262 and external request manager 202 take place over a network, such as a local area network, wide area network, wireless network, or any other network. Alternatively, a client resides on the same computer system 100 as external request manager 206 and communication occurs over a communication infrastructure 102.

FIG. 4 shows a portion of an exemplary DB view in accordance with one or more embodiments. BusinessPartner DB view 400 is a stored SQL query which generates BusinessPartner tables 500 and 520 shown in FIGS. 5A and 5B. BusinessPartner table 520 includes row 540 corresponding to a record which was not present in data store 204 when Business Partner table 500 was generated. As long as the schema for data manager 202 has not changed, DB view 400 does not need to be updated to return current data, even if records in data store 204 are modified. DB view 400 comprises SQL commands on various columns of tables in data store 204, such as column 452 of table 450. The SQL commands are determined based on the schema of the MDM repository. Field names 402-418 correspond to columns 502-518 and 522-538. Field names 402-418 are determined from the schema information provided by master data manager 202.

Figure 3:
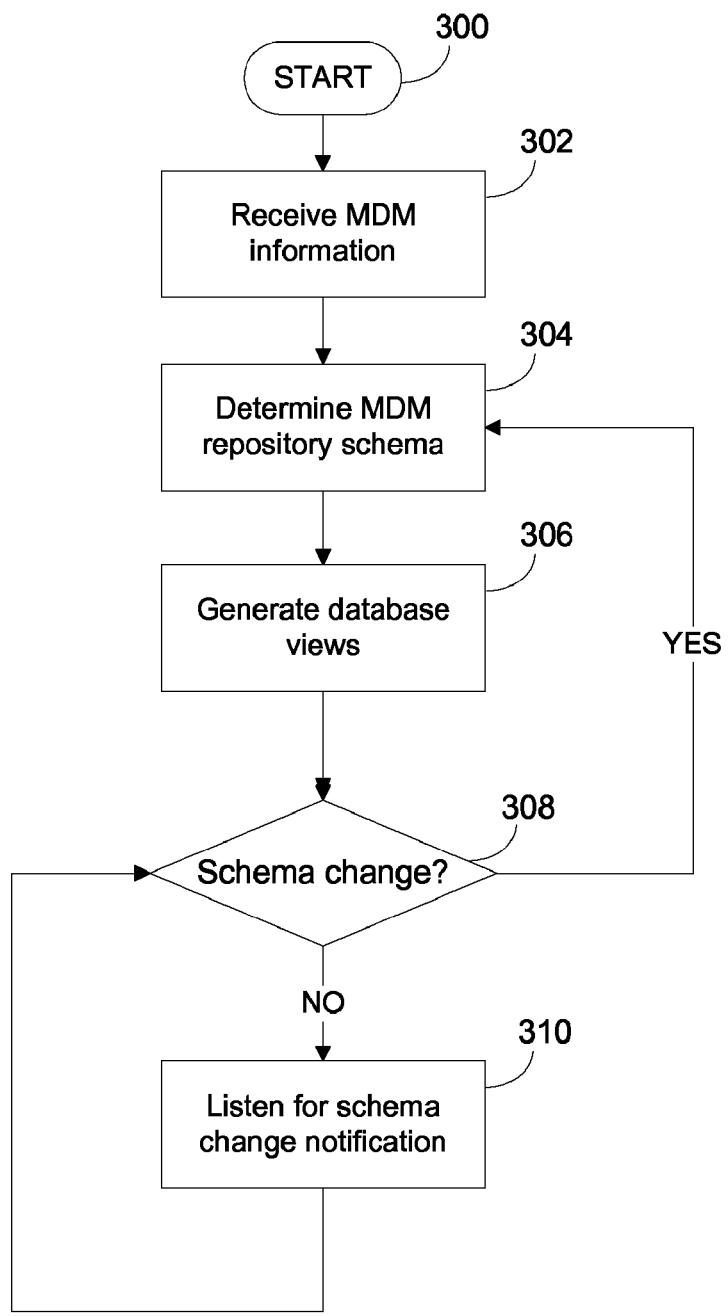
FIG. 3 provides a diagram of process steps to generate database views (DB views) according to one or more embodiments.

FIG. 3 provides a diagram of process steps to generate DB views for use in accordance with one or more embodiments. The process begins at step 300. Processing continues to step 302, where information describing a dynamic schema of a master data management system is received. In one or more embodiments, the information comprises metadata tables generated by the master data management system. In another embodiment, the information comprises table and field names and their properties. An artisan of ordinary skill in the art would appreciate that any set of information provided by the master data management system from which the schema can be determined is sufficient to carry out the solution disclosed herein. Processing continues to step 304, where the schema of the MDM repository is determined using the information received in step 302.

Processing continues to step 306, where DB views are generated. In one or more embodiments, DB views are recursively generated. An artisan of ordinary skill in the art would appreciate that embodiments may combine step 304 of determining the schema and step 306 of generating DB views. Recursive generation of DB views is described below in further detail with reference to FIG. 6.

Processing continues to step 308, where it is determined whether a schema change has occurred. In one or more embodiments, a component of the master data management system notifies the process of a change, such as new or deleted tables and fields, changed relationships, edits to data dictionaries or any other schema change. Alternatively, the process actively checks for schema changes. It will be apparent to an artisan of ordinary skill that many methods exist in the art to implement event notification or detection. If no schema change is detected, the process continues to step 310 and waits for a schema change notification.

If a schema change is detected, the process returns to step 304. In one or more embodiments, when a schema change is detected, the current DB views are unloaded, updated DB views are generated using new information on the changed schema, and the updated DB views are reloaded. Alternatively, only a subset of the DB views affected by the schema change are replaced.

FIG. 6 provides exemplary partial pseudocode of the recursive generation of DB views in one or more embodiments, such as the DB view presented in FIG. 4. Create_main_table_view( ) begins the generation of DB views starting with the main table of the master data management system, a new DB view name is created. For each viewable member field of the table, if the lookup is a single value, Create_lookup_table_view( ) is called. Otherwise, if the lookup is a tuple, Create_MV_lookup_table_view( ) is called. Create_lookup_table_view( ) and Create_lookup_table_view( ) are recursively called, depending on whether the lookup is a tuple or a single value. Create_template_view_name( ) is used to create identifiers for each DB view, and Template_list keeps track of processed DB views based on the identifiers.

In one or more embodiments, a presentation rule for each data field type of the master data management system is used to determine a format for the field in the DB view. A presentation rule can handle differences between the way the master data management system presents and stores the data. Exemplary simple lookup fields and their presentation rules as used in one or more embodiments are shown in Table 1.

The usage of tuples in a master data management system designed to store data in a proprietary schema is described in U.S. Patent Application Publication Number 2009/0144320, which is incorporated herein by reference in its entirety. The function addSqlParts generates portions of the SQL query for the DB view as fields are processed.

Figures 7A, 7B:
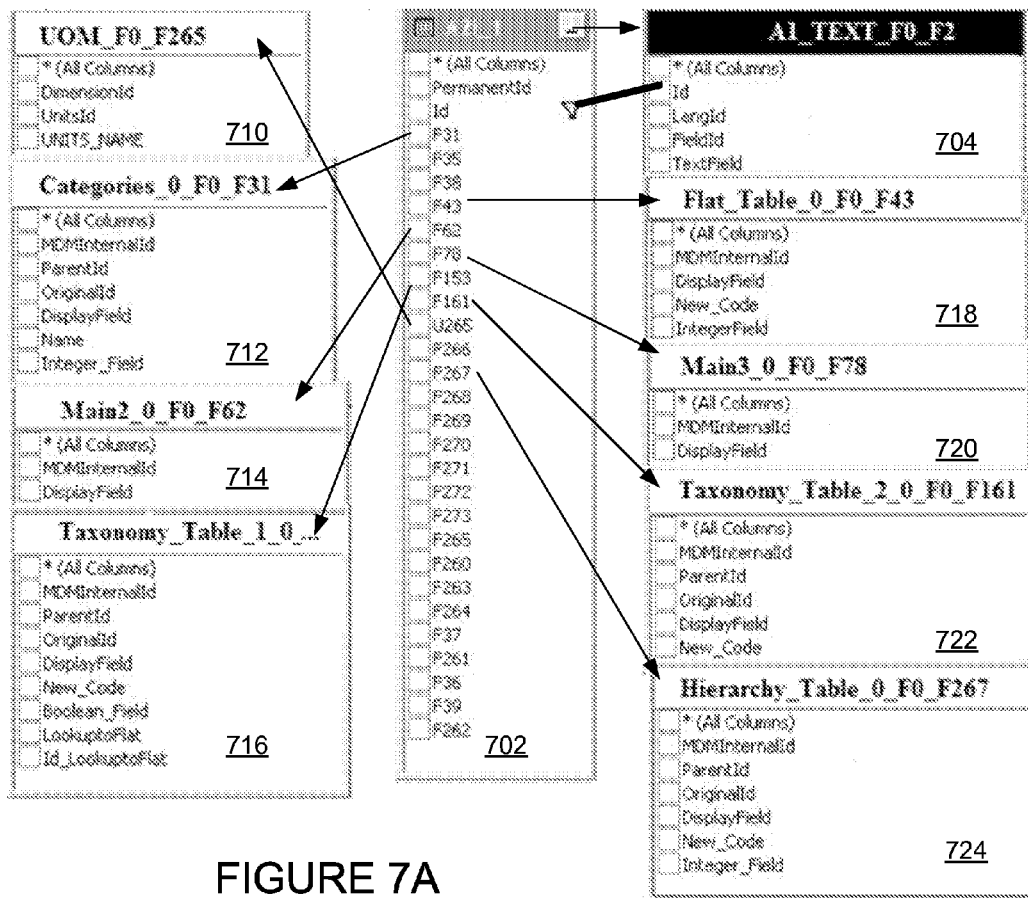
FIG. 7A illustrates views and tables used to recursively generate an exemplary DB view in one or more embodiments.
FIG. 7B provides a portion of a DB view which references to other DB views in one or more embodiments.

FIG. 7A illustrates a graphical representation of a selection of views and tables used to recursively generate an exemplary DB view in one or more embodiments. In one or more embodiments, a SQL query underlies each graphical representation of DB views 710-724. In one or more embodiments, DB views 710-724 are database queries constructed recursively from information describing a dynamic schema of a master data management system, such as metadata tables generated by a master data management system or table and field names and their properties. Main table 702 and database table 704 are managed by a master data management system.

In one or more embodiments, DB views 710-724 are used in the generation of another DB view. FIG. 7B provides a partial DB view 750 as a partial SQL query which references DB views 710-722 at positions 710B-722B of a SQL query. In one or more embodiments, partial DB view 750 is generated as part of a recursive process, such as the recursive process outlined by FIG. 6.

TABLE 1

| | Simple Lookup Fields |
|---|---|
| Field Type | Presentation Rule |
| Text | According to DB variable length, Unicode data field format, and the selected language |
| Text Normalized | According to DB variable length, Unicode data field format, and the selected language |
| Text Large | According to DB variable length, Unicode data field format, and the selected language ▫ Contains square characters as a delimiter between log entries |
| Integer | According to DB field format |
| Real | Decimal places according to field parameter |
| Boolean | TRUE/FALSE values according to field parameter |
| Literal Date | Date field data type with time portion truncated (12:00:00) |
| Literal Time | Date field data type with date portion truncated (01-01-1970) |
| Lookup [Flat] | According to the display field definition, a text field should be presented according to the selected language |
| Lookup [Hierarchy/Taxonomy] | According to the hierarchy table primary display field definition. The hierarchy node name should be fully visible with a user defined separator between each node name of the full hierarchy path<br>For example, Tools → Hand Tools → Hammer |
| Lookup [Text Block] | According to the TextStart field concatenated with the TextRest field of A2i_Data_Ex_# table, within a text field size limitation of the DB vendor |
| Lookup [Text HTML] | According to the TextStart field concatenated with the TextRest field of A2i_Data_Ex_# table, within a text field size limitation of the DB vendor |
| Auto ID | According to DB field format |
| Time Stamp | Date field data type |
| Create Stamp | mm-dd-yy hh-mm-ss AM (or PM) in datetime data type |

TABLE 1-continued

Simple Lookup Fields

| Field Type | Presentation Rule |
|---|---|
| User Stamp | According to DB field format |
| Currency | Symbol and Decimal places according to field parameter |
| GM Time | Date field data type |
| Log | Converted to text, within the text field size limitation of the DB in use |
| | Contains square characters as a delimiter between log entries |
| Measurement | Decimal places according to field parameter, postfix value with UOM name |

What is claimed is:

1. A method of providing semantic access of data in a master data management system comprising:
   receiving information describing a schema of said master data management system storing information in a data store, wherein said schema is dynamic;
   determining said schema from said information;
   generating, by a database view manager within an external request manager, a set of database views based on said schema without replicating information in the data store, wherein at least one database view is a client-specific database view for a client, and further wherein said client-specific database view is configured to restrict access to a subset of said data said client is authorized to access;
   receiving, at the request manager, a query from an external application in a standard query language;
   performing said query using at least one database view in said set of database views;
   detecting a change in said schema;
   receiving new information describing a new schema;
   determining the new schema from said new information;
   generating, by the database view manager, an updated set of database views based on the new schema, wherein the updated set of database views includes an updated client-specific database view; and
   replacing said set of database views with said updated set of database views.

2. The method of claim 1, wherein said information comprises table and field names and their properties.

3. The method of claim 1, wherein said information comprises metadata tables generated by said master data management system.

4. The method of claim 1, wherein said standard query language is Structured Query Language (SQL).

5. The method of claim 1, wherein each database view in said set of database views comprises a stored database query.

6. The method of claim 1, wherein said query is limited to read-only queries.

7. A computer system comprising a special purpose computer, said special purpose computer comprising computer-readable instructions and data stored on a computer-readable medium accessible by said special purpose computer, said computer-readable instructions implementing a process for ordering tasks with complex interrelationships, said system comprising:
   a computer;
   a non-transitory computer-readable medium coupled to said computer, said computer-readable medium comprising computer-readable instructions and data, said computer-readable instructions and data configured to:
      receive information describing a schema of a master data management system storing information in a data store, wherein said schema is dynamic;
      determine said schema from said information;
      generate, by a database view manager within an external request manager, a set of database views based on said schema without replicating information in the data store, wherein at least one database view is a client-specific database view for a client, and further wherein said client-specific database view is configured to restrict access to a subset of said data said client is authorized to access;
      receive, at the request manager, a query from an external application in a standard query language;
      perform said query using at least one database view in said set of database views;
      detect a change in said schema;
      receive new information describing a new schema;
      determine the new schema from said new information;
      generate, by the database view manager, an updated set of database views based on the new schema, wherein the updated set of database views includes an updated client-specific database view; and
      replace said set of database views with said updated set of database views.

8. The computer system of claim 7, wherein each database view in said set of database view comprises a stored database query.

9. The computer system of claim 7, wherein said standard query language is SQL.

10. The computer system of claim 7, wherein said information comprises table and field names and their properties.

11. The computer system of claim 7, wherein said information comprises metadata tables generated by said master data management system.

12. The computer system of claim 7, wherein said query is limited to read-only queries.

* * * * *